(12) United States Patent
Ray, Jr. et al.

(10) Patent No.: US 6,855,454 B2
(45) Date of Patent: Feb. 15, 2005

(54) ELECTROCHEMICAL CELL HAVING VENTING CURRENT COLLECTOR AND SEAL ASSEMBLY

(75) Inventors: Robert E. Ray, Jr., Strongsville, OH (US); James Xixian Wu, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 212 days.

(21) Appl. No.: 10/034,687

(22) Filed: Dec. 20, 2001

(65) Prior Publication Data

US 2003/0118892 A1 Jun. 26, 2003

(51) Int. Cl.[7] .................. H01M 2/12; H01M 2/26; H01M 2/08
(52) U.S. Cl. ................. 429/54; 429/57; 429/171; 429/185
(58) Field of Search ................. 429/82, 89, 161, 429/164, 171, 185, 53, 54, 55, 57

(56) References Cited

U.S. PATENT DOCUMENTS

| | | |
|---|---|---|
| 454,598 A | 6/1891 | Hathaway |
| 1,650,319 A | 11/1927 | Briggs |
| 2,060,799 A | 11/1936 | Drummond ............... 136/133 |
| 3,062,910 A | 11/1962 | Schenk, Jr. ............... 136/133 |
| 3,497,104 A | 2/1970 | White ....................... 220/44 |
| 3,923,548 A | 12/1975 | Bell et al. ................. 136/133 |
| 3,967,977 A | 7/1976 | Affeldt ...................... 136/133 |
| 3,980,500 A | 9/1976 | Sorenson et al. ........... 429/54 |
| 4,366,213 A | 12/1982 | Tamminen ................ 429/110 |
| 4,431,716 A | 2/1984 | Eppley et al. .............. 429/53 |
| 4,567,118 A | 1/1986 | Connelly ................... 429/53 |
| 4,672,010 A | 6/1987 | Tucholski et al. .......... 429/56 |
| 5,080,985 A | 1/1992 | Wiacek et al. ............. 429/172 |
| 5,227,261 A | 7/1993 | Georgopoulos .............. 429/56 |
| 5,532,075 A | 7/1996 | Alexandres et al. ........ 429/54 |
| 5,588,970 A | 12/1996 | Hughett et al. ............ 29/623.2 |
| 5,667,912 A | 9/1997 | Georgopoulos ............. 429/170 |
| 6,022,635 A | 2/2000 | O'Hara, III et al. ........ 429/56 |

FOREIGN PATENT DOCUMENTS

| | | | |
|---|---|---|---|
| CA | 959926 | 12/1974 | |
| CA | 962736 | 2/1975 | |
| EP | 0349156 | 1/1990 | |
| GB | 2215119 | 9/1989 | |
| JP | 541008 | 6/1968 | |
| JP | 42161972 | 2/1972 | |
| JP | 59033751 | 2/1984 | ........... H01M/2/12 |
| JP | 05144445 | 6/1993 | |
| JP | 05182648 | 7/1993 | |
| JP | 05325929 | 12/1993 | |
| JP | 08250083 | 9/1996 | |
| JP | 09153351 | 6/1997 | |
| JP | 09245758 | 9/1997 | |
| JP | 0011981 | 1/2000 | |
| JP | 2000138041 | 5/2000 | |
| JP | 3077215 | 6/2000 | |
| WO | WO9965091 | 12/1999 | |
| WO | 00/11740 | 3/2000 | ........... H01M/4/75 |
| WO | 01/20693 | 3/2001 | ........... H01M/2/08 |

Primary Examiner—Gregg Cantelmo
(74) Attorney, Agent, or Firm—Russell H. Toye, Jr.

(57) ABSTRACT

A low profile collector and seal assembly for sealing the open end of a container of an electrochemical cell and providing venting of pressurized gases. An electrochemical cell has a can with a closed bottom end and an open top end, positive and negative electrodes disposed in the can, and a collector and seal assembly disposed in the open top end of the can for closing the open top end of the can. The collector and seal assembly includes a current collector and an annular seal that move relative to each other from a sealed position to a vented position when the internal cell pressure reaches a pressure threshold to vent pressurized gases.

23 Claims, 7 Drawing Sheets

ELECTROCHEMICAL CELL HAVING VENTING CURRENT COLLECTOR AND SEAL ASSEMBLY

BACKGROUND OF THE INVENTION

The present invention generally relates to electrochemical cells (i.e., batteries) and, more particularly, to a current collector and seal assembly for sealing the open end of a cell container and providing pressure relief for venting gases when exposed to excessive pressure.

Conventional alkaline electrochemical cells generally include a steel cylindrical can having a positive electrode, referred to as the cathode, which commonly comprises manganese dioxide as the active material. The electrochemical cell also includes a negative electrode, referred to as the anode, which commonly comprises zinc powder as the active material. In bobbin-type cells, the cathode is typically formed against the interior surface of the steel can, while the anode is generally centrally disposed in the can. A separator is located between the anode and the cathode, and an alkaline electrolyte solution simultaneously contacts the anode, the cathode, and the separator. A conductive current collector is inserted into the anode active material to provide an electrical path to a negative outer terminal. An annular polymeric (e.g., nylon) seal provides closure to the open end of the steel can to seal the active electrochemical materials in the sealed volume of the can. An inner cover radially supports the seal. The current collector, inner cover, and seal are typically assembled together to form a collector and seal assembly.

Cylindrical alkaline cells are typically sealed closed by placing the collector and seal assembly in the open end of the steel can and crimping the upper end of the can inwardly and over the outer periphery of the seal to compress the seal. However, electrochemical cells commonly employ electrochemically active materials, such as zinc, which generate hydrogen gas, particularly when subjected to abusive discharge conditions, such as battery reversal, as well as during storage, and sometimes during or following service use. When the can is sealed closed, excessive build-up of high pressure gases within the sealed can may force the crimped closure open and cause damage to the cell and/or the device in which the cell is employed.

One approach to avoiding a potentially excessive build-up of pressure in a cell has been to employ a resealable valve system that periodically releases excessive pressurized gases from within the active cell volume. However, the continued periodic release of pressurized gases may, in some situations, permit the release of electrolyte solution containing salts or other particulate matter, which may foul the resealable valve, and such systems generally require additional costly components. Another approach to avoiding excessive build-up of internal pressure involves employing a sealed membrane that is intended to blow out when exposed to excessive pressure either by puncture or rupture of the membrane itself. A puncture mechanism, such as a spiked member, may be employed to punch a hole in the sealed membrane once the internal pressure reaches a predetermined amount.

A further approach to venting excessively pressurized gases has included the use of a vent formed in the seal which is intended to rupture upon experiencing an excessive pressure build-up in the sealed interval volume of the cell. As an example, U.S. Pat. No. 5,667,912 discloses a current collector assembly having a seal with a thinned portion formed in the seal diaphragm axisymmetrical about a rotation of the central longitudinal axis of the cell. The thinned portion of the seal is intended to shear when the internal pressure exceeds a predetermined pressure threshold, to thereby create a pressure relief vent passage.

While the aforementioned conventional approaches have served to vent high pressure gases in commercial cells, many of these approaches involve complex seal designs which consume a significant amount of volume. Increased collector and seal assembly volume generally results in reduced internal volume available for electrochemically active materials, thus limiting the service performance capability of the cell. Additionally, some conventional venting seals exhibit poor leakage performance. Further, the venting pressure is generally limited in conventional rupture type venting seals due to the difficulty in injection molding the thinned portion of the seal. Accordingly, it is therefore desirable to provide for an electrochemical cell having a simplified, low profile collector and seal assembly that effectively vents pressurized gases at a predetermined pressure, is capable of achieving lower vent pressures, and exhibits enhanced leakage performance.

SUMMARY OF THE INVENTION

The present invention improves the protective safeguards of an electrochemical cell with an easy-to-manufacture and low profile collector and seal assembly for sealing the open end of an electrochemical cell container and providing controlled venting of pressurized gases. To achieve this and other advantages, and in accordance with the purpose of the invention as embodied and described herein, the present invention provides for an electrochemical cell having a container with a bottom end and an open top end, and positive and negative electrodes and an electrolyte disposed in the container. The cell further includes a collector and seal assembly disposed in the open top end of the container for closing the open top end of the container. The collector and seal assembly includes a current collector disposed in contact with one of the positive and negative electrodes, and a seal member having an opening defined by an upstanding wall. The current collector is interference fit within the opening in the seal member such that the seal member is in sealing engagement with a shaft of the current collector. The current collector and the upstanding wall of the seal member are axially (i.e., parallel to a longitudinal axis of the cell) moveable relative to each other upon experiencing a predetermined pressure to move from a sealed position to a vent position so as to provide a pressure relief passage to vent pressurized gases.

According to one aspect of the invention, the current collector has a shaft extending through an opening defined by an upstanding wall in a central hub of the seal member, and the current collector moves within the opening from a sealed position to a vent position to provide a pressure relief passage. According to another aspect of the invention, the current collector has a shaft extending through a central opening defined by an upstanding wall in the seal member and sealingly engaged with the upstanding wall of the seal member forming the central opening, and the central hub of the seal member moves on the shaft from a sealed position to a vent position to provide a pressure relief passage.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
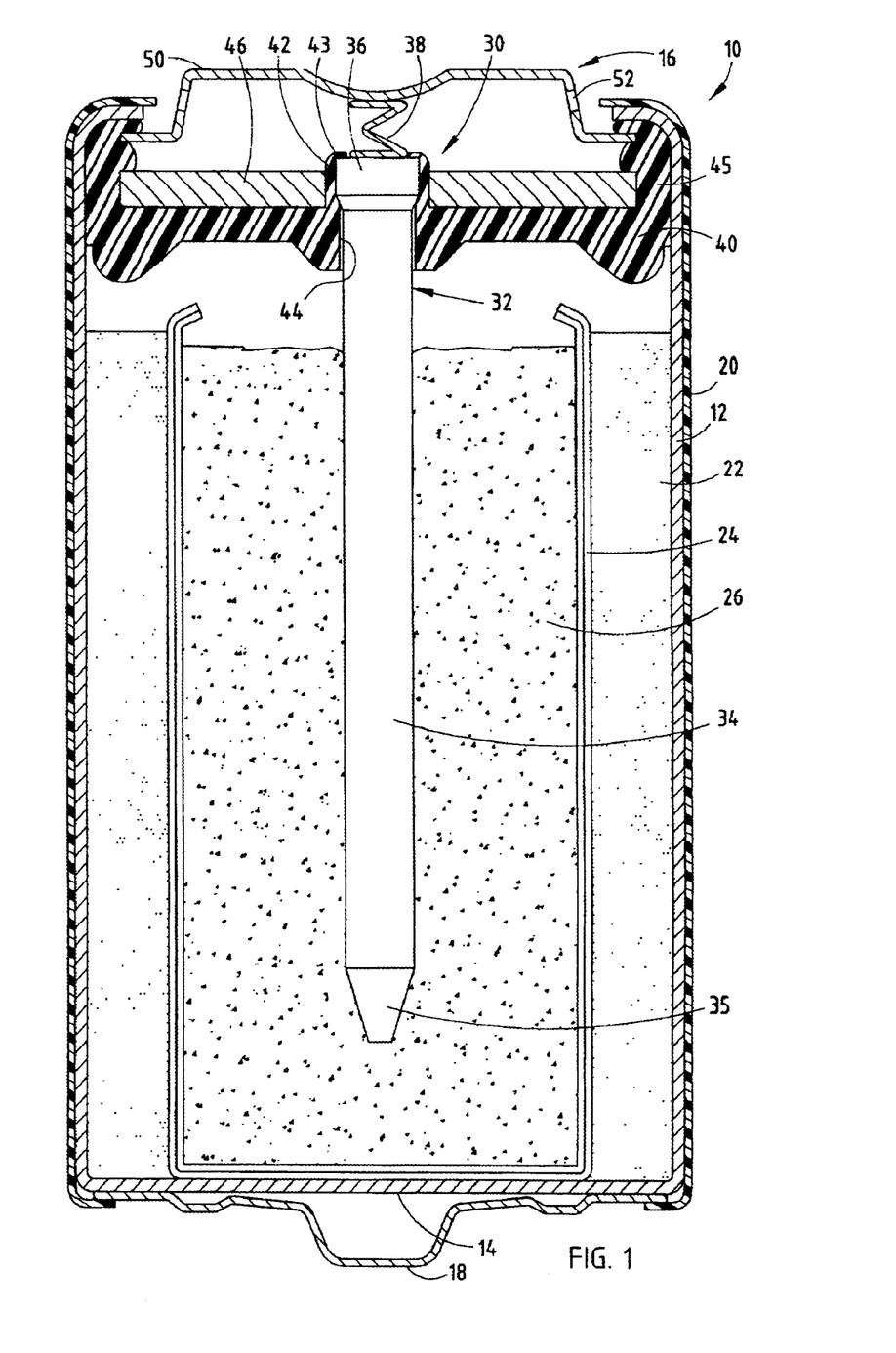
FIG. 1 is a cutaway view of an electrochemical cell having a collector and seal assembly according to a first embodiment of the present invention, shown in a sealed (non-vented) position.

Referring to FIG. 1, a cylindrical alkaline electrochemical cell 10 is shown having a collector and seal assembly 30 according to a first embodiment of the present invention. Electrochemical cell 10 includes a cylindrical steel can 12 having a closed bottom end 14, an open top end 16, and a cylindrical side wall extending between the bottom and top ends. The closed bottom end 14 of can 12 has a positive cover welded or otherwise attached thereto and formed of plated steel, with a protruding nubbin 18 at its center region, which forms the positive contact terminal of cell 10. Assembled to the open top end 16 of steel can 12 is the collector and seal assembly 30, and an outer negative cover 50, preferably formed of plated steel, which forms the negative contact terminal of cell 10. A metalized, plastic film label 20 is formed about the exterior surface of steel can 12, except for the ends of steel can 12. Film label 20 is formed over the peripheral edge of the positive cover and may extend partially over the peripheral edge of the negative cover 50.

A positive electrode 22, also referred to herein as the cathode, is formed about the interior surface of steel can 12. According to one example, the cathode 22 is formed of a mixture of manganese dioxide, graphite, potassium hydroxide solution, and additives. A separator 24, which is preferably formed of a non-woven fabric that prevents migration of any solid particles in the cell, is disposed about the interior surface of cathode 22. A negative electrode 26, also referred to herein as the anode 26, is disposed with an electrolyte inside the separator 24 and in contact with a current collector 32. The electrolyte may include an alkaline electrolyte containing potassium hydroxide (KOH). According to one example, the anode 26 is formed of zinc powder, a gelling agent, and additives. The manganese dioxide and zinc employed in the cathode 22 and anode 26, respectively, are electrochemically active materials. Accordingly, the cathode 22 is configured as the cell's positive electrode, and the anode 26 is configured as the cell's negative electrode.

The current collector 32 contacts the outer negative cover 50 which forms the negative contact terminal of cell 10. The current collector 32 is generally configured in the shape of a nail having an elongated cylindrical shaft 34, a truncated conical tip 35 at the lower end, and an enlarged head 36 at the upper end. The elongated shaft 34 is disposed in contact with the anode 26 and, in this embodiment, has a substantially uniform diameter. The current collector 32 is connected to the outer negative terminal 50 via a coiled conductive connector 38 that is compressible. The coiled connector 38 may be welded to the bottom surface of outer negative cover 50 and/or to the upper surface of enlarged head 36 of current collector 32, or alternately may be held in contact therewith via pressure contact. Current collector 32 and connector 38 serve as an electrical current path to provide the negative polarity at the outer negative cover 50.

An annular polymeric seal 40 is disposed in the open end of steel can 12 to prevent leakage of electrochemically active cell materials contained in steel can 12. Polymeric seal 40 may comprise a synthetic thermoplastic resin such as nylon. Alternate materials for seal 40 may include polypropylene, such as Noryl® Extend which is commercially available from General Electric Company, and other materials that would be recognized as suitable for seal 40.

Seal 40 has a central hub 42 with an inner upstanding cylindrical wall 44 defining a central opening (i.e., aperture) for receiving the current collector 32. Hub 42 is generally defined as the central portion of seal 40 containing upstanding wall 44 which is compressed against the current collector 32. The enlarged head 36 of current collector 32 is generally oversized for the hub opening, and thus the seal 40 is compressed against the current collector 32 to form an interference fit engagement with the inner upstanding wall 44 defining the hub opening. The upstanding wall 44 of central hub 42 is configured to sealingly engage the enlarged head 36 of current collector 32 when in a sealed (non-vented) position. The central hub 42 also has an upper edge 43 shown in FIG. 1 formed over the upper peripheral surface of enlarged head 36 to further resist upward movement of current collector 32. An inner cover 46, which is preferably formed of a rigid metal, is provided to increase the rigidity and support the radial compression of annular seal 40, thereby improving the sealing effectiveness. The inner cover 46 is configured to contact an outer upstanding wall of central hub 42 and an upstanding wall at the outer peripheral section 45 of seal 40. While an oversized current collector 32 and an inner cover 46 are used to compress the seal 40 against the current collector 32, other compression techniques such as compression rings may be employed to provide a sealed interference fit engagement between the current collector 32 and seal 40. The seal 40, inner cover 46, and outer negative cover 50 provide a low profile closure to the open end 16 of can 12. In addition, the outer negative cover 50 also includes one or more vent openings 52 that serve to expose the non-sealed volume of cell 10 to the surrounding outside atmosphere. Vent openings 52 serve to vent pressure build-up released from within the cell 10 to the outside atmosphere once the collector and seal assembly 30 vents.

Together, the current collector 32, annular seal 40, and inner cover 46 form the collector and seal assembly 30 which may be assembled together and inserted as a unit into the open end 16 of steel can 12. The assembly of the collector and seal assembly 30 and closure of the open end 16 of can 12 include disposing the annular polymeric seal 40 in the open end 16 of the can 12, which may have a flared opening or a bead formed radially inward on the inner wall of the can 12, and crimping the upper end of the can 12 inwardly and over the outer periphery 45 of the seal 40 to compress the seal 40 against the inner cover 46. It should also be appreciated that the outer negative cover 50 is electrically insulated from the steel can 12 by way of annular polymeric seal 40.

According to the present invention, the current collector and seal assembly 30 seals closed the open end 16 of can 12, provides an electrical current path to the outer negative terminal 50, and further acts a pressure relief mechanism when exposed to an excessive pressure differential. The collector and seal assembly 30 is designed to release pressurized gases from within the sealed active volume of cell 10 when the assembly 30 is exposed to a predetermined pressure differential. The pressure differential is the difference between the internal pressure below the seal 40 and the atmospheric pressure above the seal 40. The pressurized gas venting is generally achieved by relative axial (i.e., parallel to a longitudinal axis of the current collector 32) movement between the current collector 32 and annular polymeric seal 40. The pressurized gases released from the internal volume exit cell 10 via openings 52 provided in the outer negative cover 50.

Figure 2:
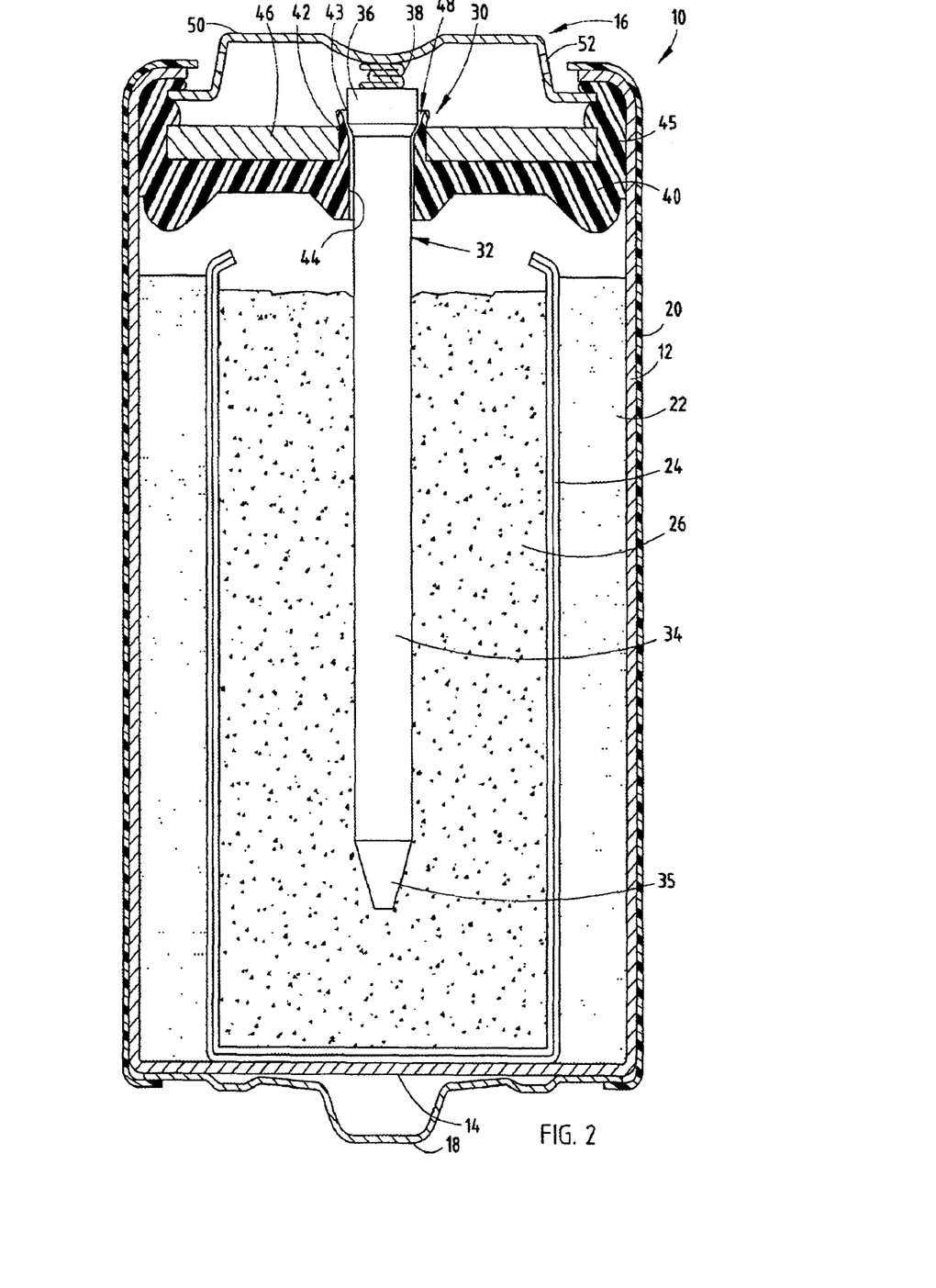
FIG. 2 is a cutaway view of the electrochemical cell of FIG. 1 with the collector and seal assembly shown in a vented position.

According to the first embodiment, current collector 32 is interference fit and sealingly engaged with annular seal 40 while in the sealed (non-vented) position as shown in FIG. 1. The sealing engagement is formed between the head 36 of collector 32 and the upstanding wall forming hub 42 of seal 40. As the pressure increases within the sealed volume, which is generally below the bottom surface of seal 40, such as may occur during an abusive condition, the internal pressure applies a force on the current collector 32 which will tend to urge the current collector 32 upward and out of sealing engagement with annular seal 40. When the pressure differential of the internal sealed volume, as compared to the outer atmospheric pressure, exceeds a predetermined pressure threshold, the current collector 32 is forced free from the sealing engagement with the hub 42 of seal 40 and moves to a vented position as shown in FIG. 2. The forced disengagement causes the upper folded end 43 of hub 42 to bend upward to allow upward movement of collector head 36. When this occurs, the current collector 32 is forced upward relative to the entire hub 42 of seal 40 which remains substantially fixed in place. It should be appreciated that the hub 42 of seal 40 generally will not move upward more than a small distance compared to the movement of the current collector 32, and thus is considered substantially fixed. In the vented position, a pressure relief passage 48 is provided between the seal hub 42 and the current collector 32 to allow for the release of pressurized gases from within the internal volume of cell 10. In addition, when the current collector 32 moves from the sealed position to the vented position, the coiled conductive connector 38 is compressed between the top surface of the current collector head 36 and the bottom surface of outer negative terminal 50. When compressed, coiled conductive connector 38 may apply an opposing spring bias force downward such that when the pressure differential decreases to a reduced pressure threshold, the current collector 32 may be biased downward so that the collector head 36 sealingly engages the seal hub 42. In the event that the internal pressure increases after resealing, the current collector 32 will again be forced upward to open the pressure relief passage 48 to further vent pressurized gases.

Figure 3:
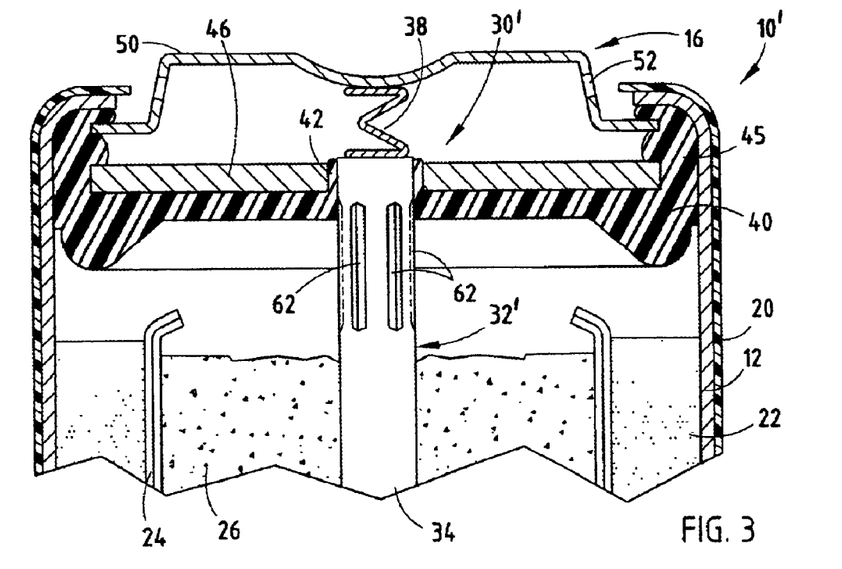
FIG. 3 is a partial cutaway view of an electrochemical cell having a collector and seal assembly according to a second embodiment of the present invention, shown in a sealed (non-vented) position.
Figure 4:
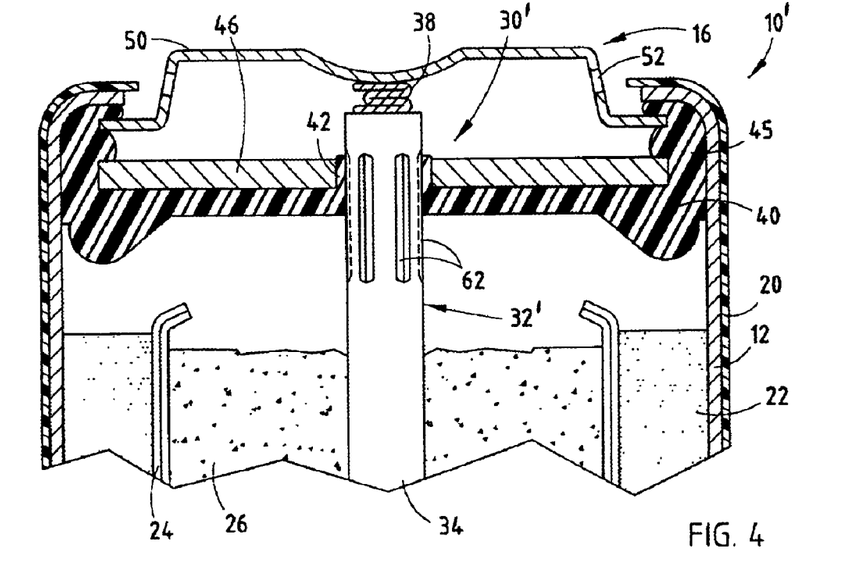
FIG. 4 is a partial cutaway view of the electrochemical cell of FIG. 3 with the collector and seal assembly shown in a vented position.

An electrochemical cell 10' is shown in FIGS. 3 and 4 having an alternatively configured current collector 32' as part of a collector and seal assembly 30'. The current collector 32' includes a main shaft 34 that extends to the uppermost end, without the enlarged head portion as discussed above. Instead, current collector 32' includes a plurality of longitudinal flutes (i.e., channels) 62 extending upward toward the uppermost end. It is preferred that the inner upstanding wall forming the hub of seal 40 be no higher than the length of the flutes 62. The current collector 32' is positioned in the sealed position such that the plurality of flutes 62 are located below seal 40, as shown in FIG. 3. The current collector 32' is interference fit and sealingly engaged with the inner upstanding wall forming the opening in hub 42 of seal 40. During the venting operation, the current collector 32' is forced upward relative to the entire hub 42 of seal 40 which remains substantially fixed in place as discussed above. When a sufficient internal pressure forces the current collector 32' upward, the longitudinal flutes 62 provide a pressure relief passage around the inner upstanding wall forming the hub of seal 40 as shown in FIG. 4. While a plurality of flutes 62 is shown, it should be appreciated that any one or more flutes may be employed according to this embodiment.

Figure 5:
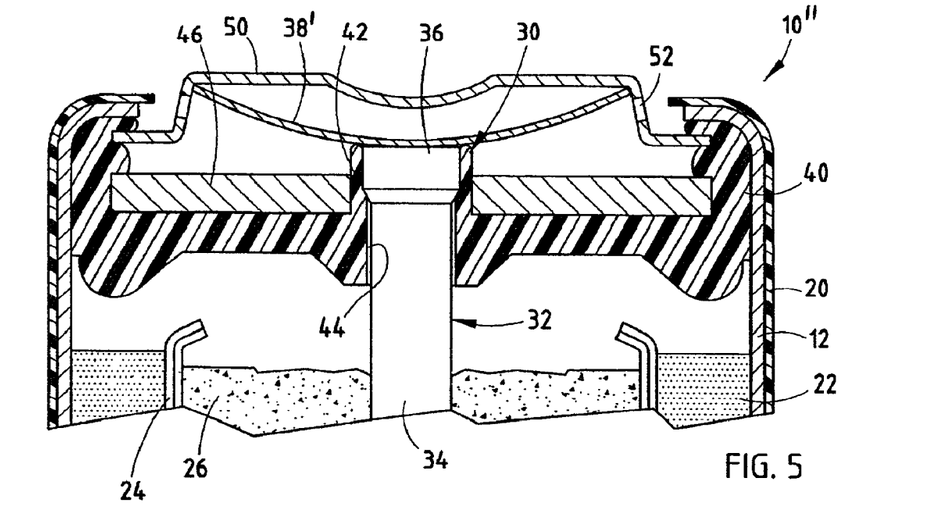
FIG. 5 is a partial cutaway view of an electrochemical cell having a collector and seal assembly according to a third embodiment of the present invention, shown in a sealed (non-vented) position.
Figure 6:
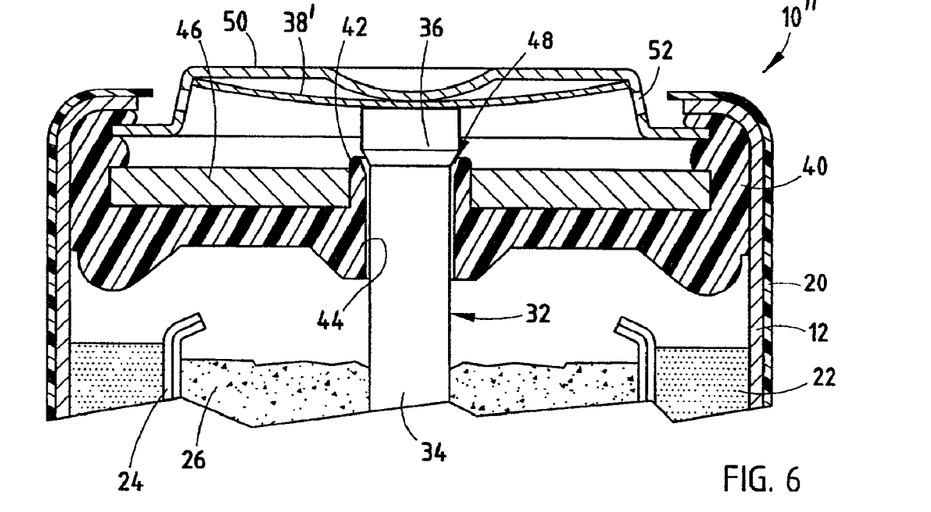
FIG. 6 is a partial cutaway view of the electrochemical cell of FIG. 5 with the collector and seal assembly shown in a vented position.
Figure 7:
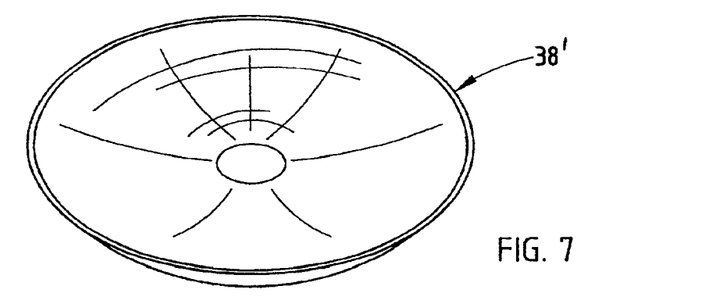
FIG. 7 is an elevated perspective view of the collector connector shown in the embodiment of FIG. 5.

Referring to FIGS. 5–7, an electrochemical cell 10", according to a third embodiment, is shown similar to cell 10 of FIG. 1, except having an alternatively configured conductive connector 38' for providing an electrical current path between the current collector 32 and outer negative cover 50. Conductive connector 38' is shown in FIG. 7 generally configured as a bowl-shaped disk made of conductive material, such as steel. With particular reference to FIG. 5, the upper outer peripheral rim engages the bottom surface of outer negative cover 50, while the bottom dome contacts the upper surface of current collector head 36. Conductive connector 38' preferably provides a downward biased force to the current collector 32 so as to maintain a sealed engagement with the annular seal 40 while in the sealed (non-vented) position. When the sealed internal pressure reaches a predetermined pressure, relative to the atmospheric pressure, the current collector 32 moves to a vented position, as shown in FIG. 6, during which the conductive connector 38' compresses vertically to allow formation of the pressure relief passage 48. Once the internal pressure decreases to a lower pressure, the conductive connector 38' may force the current collector 32 back into sealing engagement with seal 40, as discussed above in connection with the first embodiment.

Figure 8:
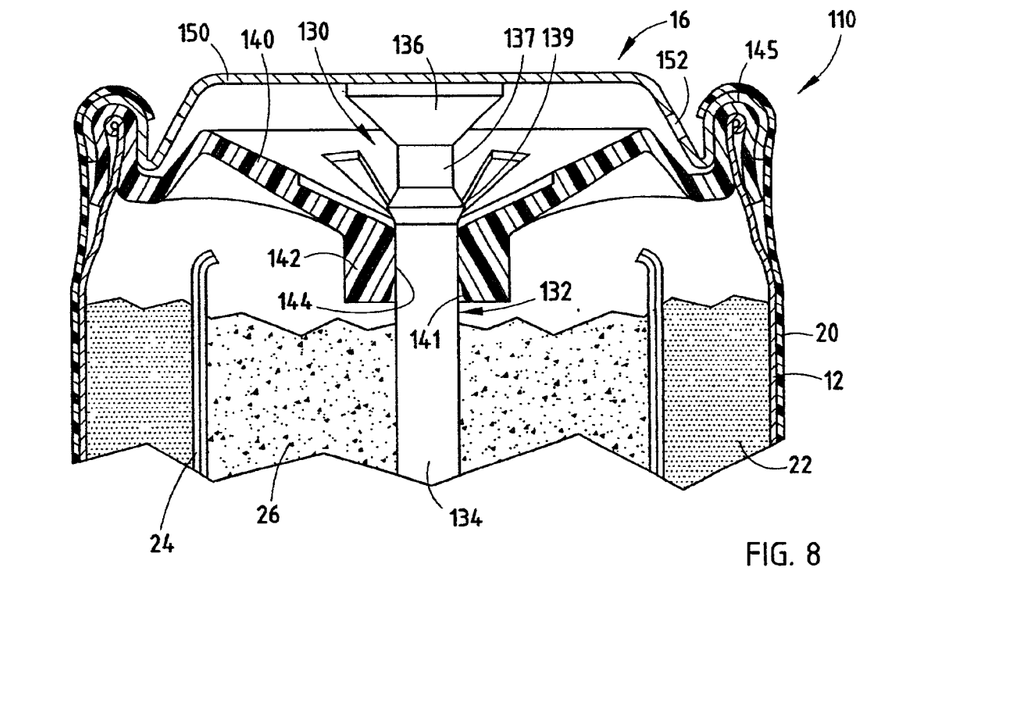
FIG. 8 is a partial cutaway view of an electrochemical cell having a collector and seal assembly according to a fourth embodiment of the present invention, shown in a sealed (non-vented) position.
Figure 9:
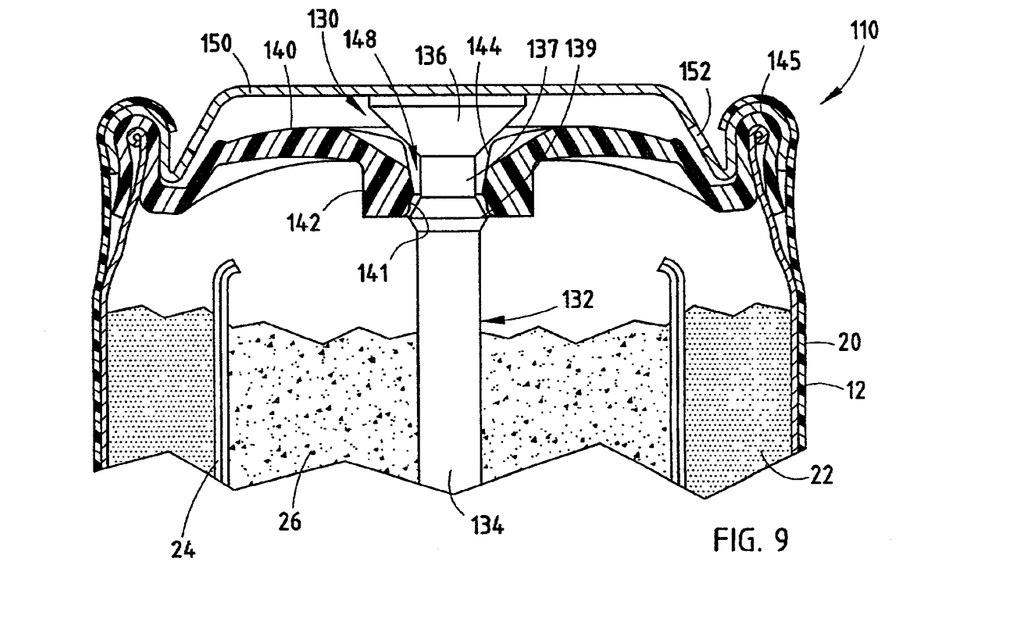
FIG. 9 is a partial cutaway view of the electrochemical cell of FIG. 8 with the collector and seal assembly shown in a vented position.
Figure 10:
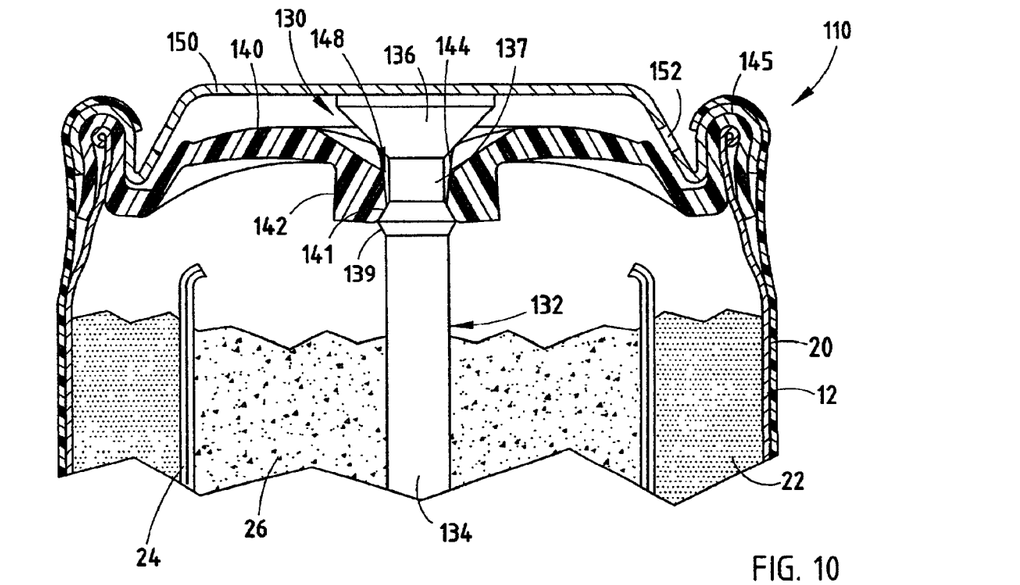
FIG. 10 is a partial cutaway view of the electrochemical cell of FIG. 8 with the collector and seal assembly partially retracted from the vented position.

An electrochemical cell 110 is shown in FIGS. 8–10 having a collector and seal assembly 130 according to a fourth embodiment of the present invention. Electrochemical cell 110 includes a steel can 12, label 20, cathode 22, separator 24, and an anode 26, as described above in connection with the first and second embodiments. According to the fourth embodiment, electrochemical cell 110 includes collector and seal assembly 130 for sealing closed the open end 16 of can 12, providing an electrical current path to an outer negative cover 150, and providing a pressure relief mechanism to vent pressurized gases. The collector and seal assembly 130 includes an annular polymeric seal 140 and a current collector 132. The current collector and seal assembly 130 of the fourth embodiment does not require an inner cover as used in the collector and seal assemblies of the first, second, and third embodiments described above.

The current collector 132 includes a lower cylindrical shaft 134, an enlarged diameter step 139, a reduced diameter cylindrical shaft 137, and an enlarged head 136 at the upper end. The lower shaft 134 of current collector 132 extends into and contacts anode 26. The reduced diameter shaft 137 is located between the enlarged diameter step 139 and enlarged head 136, and preferably has a diameter less than the diameter of the lower shaft 134. The upper surface of enlarged head 136 may be welded to, or in pressure contact with, outer negative cover 150.

The annular seal 140 includes a central hub 142 having an inner upstanding wall 144 defining a central opening for receiving the current collector 132. The outer peripheral portion 145 of seal 140 forms a sealed closure against the can 12 and provides dielectric isolation between steel can 12 and outer negative cover 150. It should be appreciated that the open end 16 of the can 12, seal 140, and outer cover 150 are crimped so as to compress the seal 140 and provide a sealed closure. The current collector 132 is interference fit within the opening formed by inner upstanding wall 144 of seal 140. The inner upstanding wall 144 of seal 140 is compressed against current collector 132 and sealingly engages the current collector 132 when in a sealed (non-vented) position as shown in FIG. 8.

Referring to FIG. 9, the electrochemical cell 110 is shown with the collector and seal assembly 130 in a vented position. When the internal pressure within the sealed volume of electrochemical cell 110 exceeds a predetermined pressure threshold, relative to the atmospheric pressure, the central hub 142 of seal 140 is forced upward due to the differential pressure applied to the seal 140. When the pressure differential exceeds the pressure threshold, hub 142 is forced over the enlarged diameter step 139 to a position above step 139 to provide a pressure relief passage 148 between seal 140 and current collector 132. When this occurs, the entire hub 142 is forced upward relative to the current collector 132 which remains substantially fixed in place. It should be appreciated that the current collector 132 may move upward a small distance, however, it is a relatively small distance compared to the movement of the entire hub 142 of seal 140. By providing the reduced diameter section 137, the pressure relief path 148 is provided without allowing resealing between reduced diameter section 137 and seal 140. Outer cover 150 includes one or more vent openings 152 to vent pressure build-up released from within cell 110 to the outside atmosphere.

Once the pressure differential has decreased to a lower pressure, the hub 142 of seal 140 may slide downwardly (retract) back into sealing engagement on the upper side of the enlarged diameter step 139 as shown in FIG. 10. Central hub 142 of seal 140 has a shaped surface indentation (bevel) 141 provided in the lower section of upstanding wall 144 which substantially conforms to the shape of the upper surface of enlarged diameter step 139. Upon retracting downward, the seal 140 may again sealingly engage current collector 132 to prevent further discharge of gases and other material. It should be appreciated that upon the pressure differential increasing, additional venting of pressurized gases may occur.

Figure 11:
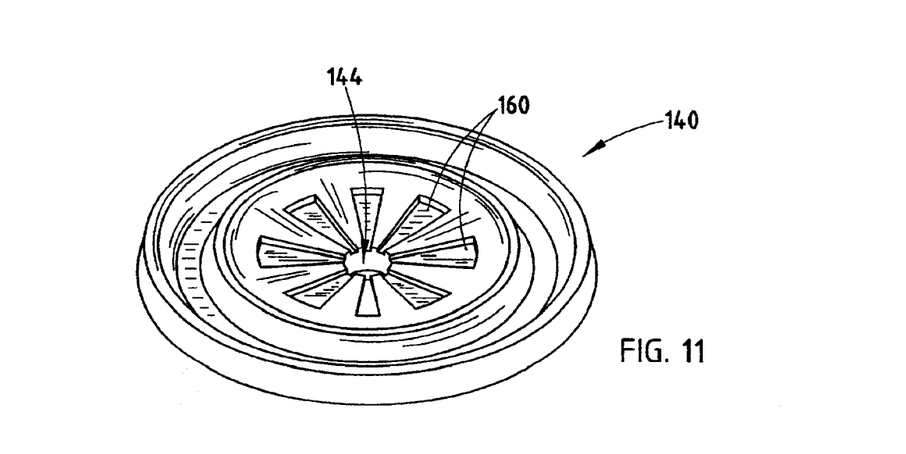
FIG. 11 is an elevated perspective view of the annular seal member shown in the embodiment of FIG. 8.

With particular reference to FIG. 11, the annular polymeric seal 140 is shown having a plurality of channels 160 formed in the upper surface. It should be appreciated that by employing one or more standoff members, such as channels 160, in the upper surface of seal 140, the channels 160 provide a vent path to prevent resealing of seal 140 with current collector 132 when in the vent position. It should also be appreciated that as an alternative to channels, other standoff members, such as ribs or other surface protrusions, may be provided either on the upper surface of seal 140 or on the surface of current collector 130 to prevent resealing during the venting operation. Examples of anti-resealing assemblies are disclosed in U.S. Application Ser. No. 09/300,413, filed Apr. 27, 1999, now U.S. Pat. No. 6,270,919, issued Aug. 7, 2001, entitled "ELECTROCHEMICAL CELL HAVING LOW PROFILE SEAL ASSEMBLY WITH ANTI-RESEALING VENT," which is hereby incorporated by reference.

Figure 12:
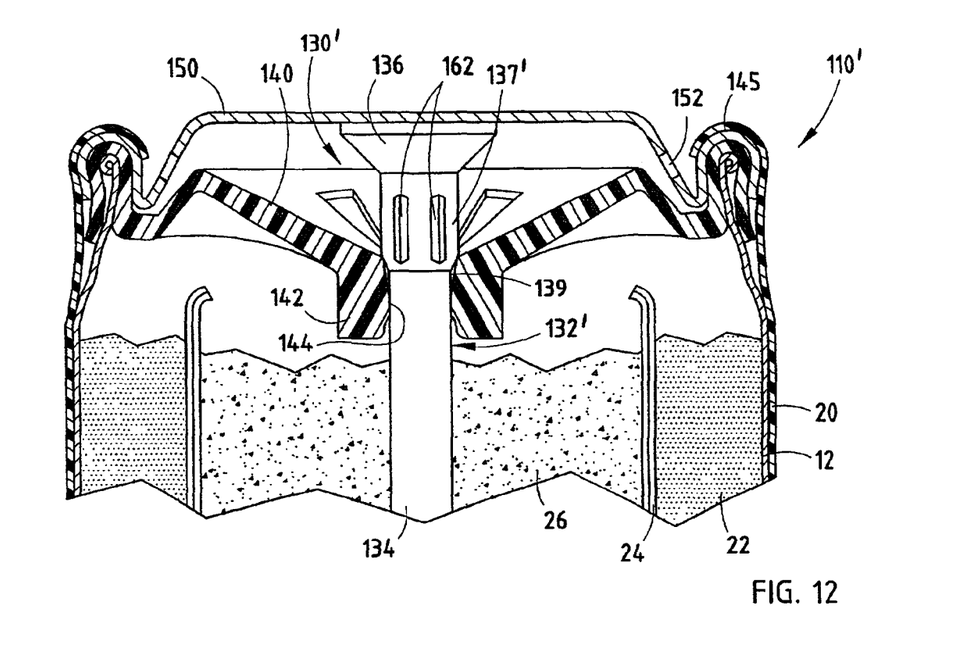
FIG. 12 is a partial cutaway view of an electrochemical cell having a collector and seal assembly according to a fifth embodiment of the present invention, shown in a sealed (non-vented) position.
Figure 13:
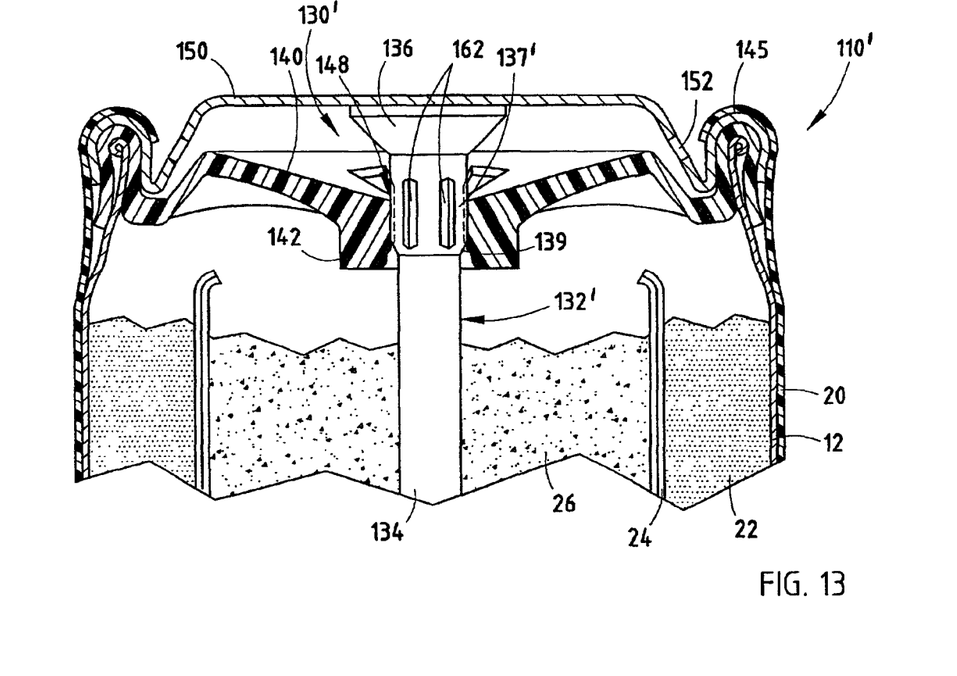
FIG. 13 is a partial cutaway view of the electrochemical cell of FIG. 12 with the collector and seal assembly shown in a vented position.

Referring to FIGS. 12 and 13, an electrochemical cell 110' is illustrated having a collector and seal assembly 130' according to a fifth embodiment of the present invention. The electrochemical cell 110 likewise includes a steel can 12, label 20, cathode 22, separator 24, anode 26, and other components as discussed above. The collector and seal assembly 130' of the fifth embodiment includes a current collector 132' having a lower shaft 134, an enlarged diameter step 139, and a plurality of longitudinal flutes (i.e., channels) 162 extending from the enlarged diameter step 139 upward toward the enlarged head 136. The current collector 132' is likewise connected to the outer negative cover 150. The plurality of flutes 162 provide pressure relief passages 148 for releasing pressurized gases from the internal volume of the cell 110' in a controlled operation. In the non-vented position, shown in FIG. 12, the hub 142 of seal 140 provides sealing engagement between upstanding walls 144 and each of shaft 134 and step 139 of current collector 132'. The shaft 134 of current collector 132' is interference fit within the opening formed by the inner walls of hub 142 of seal 140. When the internal pressure within the sealed volume of cell 110' increases beyond a predetermined pressure threshold, the central hub 142 slides upward along current collector 132' until one or more pressure relief passages 148 are provided through flutes 162 to release the high pressure gases from within the sealed volume, as shown in FIG. 13. It should be appreciated that the current collector 132' remains substantially fixed, relative to the movement of the entire hub 142 of seal 140, as discussed above. By providing a plurality of flutes 162 to serve as the pressure relief passages, a controlled low pressure release of gases may be achieved according to this embodiment.

The seal member 140 is made of a polymeric material, such as Noryl® Extend which is commercially available from General Electric Company of Selkirk, N.Y. Noryl® Extend is a polypropylene matrix having polyethylene therein, which acts as a polymer stiffener. Noryl® Extend provides low moisture absorption, will not hydrolyze in the presence of KOH, and has very low stress relaxation. These characteristics allow the seal design of the present invention to be feasible, whereas use of a material such as nylon for the seal 140 of the present invention would require the use of a support. This is due to nylon cracking in the presence of KOH coupled with stress on the seal (in the hoop direction) due to the nail vent design.

It should be appreciated that, while Noryl® Extend is a preferred material for seal 140 that resists cracking, particularly in the central hub, other seal materials could be used. For example, the seal members 40 and 140 may include nylon, such as Zytel® 101F, which is commercially available from E. I. duPont deNemours and Co. Inc. Seal members 40 and 140 can be integrally formed using a conventional injection molding process. In addition, the bottom surface of seal members 40 and 140 may be coated with a layer of asphalt (not shown) or other suitable material to prevent chemical degradation of the seal member due to the presence of electrolyte.

While the various embodiments described herein provide a pressure relief passage achieved by relative axial movement between a collector and a seal, it should be appreciated that other vent passages may be provided. For example, the relative movement between the seal and collector may be designed to cause the seal hub to split open, thereby further creating a pressure relief passage through the split opening.

Accordingly, the present invention advantageously provides collector and seal assemblies for sealing the open end of an electrochemical cell and realizing a controlled venting operation to vent high pressure gases, particularly when the cell is subjected to an abusive condition. The collector and seal assemblies of the present invention each offer a simplified seal design in a low profile assembly which results in greater volume available for active battery components. The seals of the present invention are easy to mold, since no conventional thin sections are required for the vent diaphragm. In addition, a wide range of vent pressures is achievable by adjusting the nail step diameter in its relation to the seal hub inside diameter, seal hub outside diameter, and nail diameter below the enlarged diameter step. The venting rate can easily be adjusted with the collector and seal assemblies of the present application. Generally, the pressurized gases in the cell will escape faster if the diameter difference between the vent region of the nail and seal is made greater, and if the vent channel cross section area on top of the seal is increased. Likewise, the seal can be designed to vent slower to create less release spray if the diameter clearance is decreased or the vent channel is decreased. By providing the seal such that it can flex back to a non-vent position, reduced or prevented leakage of electrolyte after the seal has vented can be achieved. Further, it should be appreciated that the collector and seal assemblies of the present invention employ fewer parts and less volume than conventional seal assemblies.

While the collector and seal assemblies have been described herein in connection with a cylindrical bobbin-type electrochemical cell, it should be appreciated that the invention concepts are likewise applicable to various other cell configurations including jelly roll cells, prismatic cells, cells employing multiple anodes and multiple current collectors and cells in which the cans and current collectors are electrically connected to the negative and positive electrodes, respectively. Additionally, it should also be appreciated that the collector and seal assemblies described herein may be sealed closed against the steel can using various different can closures.

It will be understood by those who practice the invention and those skilled in the art, that various modifications and improvements may be made to the invention without departing from the spirit of the disclosed concepts. The scope of protection afforded is to be determined by the claims and by the breadth of interpretation allowed by law.

The invention claimed is:

1. An electrochemical cell comprising:
   a container having a bottom end and an open top end;
   a positive electrode disposed in said container;
   a negative electrode disposed in said container;
   a seal member disposed in the open top end of said container for closing the open top end of said container, said seal member having an opening defined by an upstanding wall; and
   a current collector having a shaft extending through the opening in said seal member and contacting one of the positive and negative electrodes, wherein the current collector is interference fit within the opening such that the upstanding wall of the seal member sealingly engages the shaft of the current collector when in a sealed position, and the upstanding wall of the seal member is axially movable along the shaft of the current collector to a vent position upon experiencing a predetermined pressure so as to provide a pressure relief passage between the upstanding wall of the seal member and the current collector to vent pressurized gases; wherein
   the upstanding wall of the seal member is retained in the sealed position by an enlarged diameter step provided on the shaft of the current collector, and the upstanding wall of the seal member is forced to move over the enlarged diameter step to the vent position.

2. The electrochemical cell as defined in claim 1, wherein said seal member and current collector form a collector and seal assembly.

3. The electrochemical cell as defined in claim 1, wherein said current collector includes a shaft having a first diameter sealingly engaging the upstanding wall of the seal member in the sealed position, and a second reduced diameter shaft that has a diameter less than the first diameter, wherein the upstanding wall of the seal member is forced to move towards the second reduced diameter to provide the pressure relief passage when the seal member is in the vent position.

4. The electrochemical cell as defined in claim 1, wherein said current collector has one or more flutes formed therein for providing the pressure relief passage when in the vent position.

5. The electrochemical cell as defined in claim 1, wherein said seal member includes a vent path provided on the top surface of the seal member to prevent resealing of the current collector and seal member when in the vent position.

6. The electrochemical cell as defined in claim 1, wherein said seal member comprises polypropylene.

7. The electrochemical cell as defined in claim 1, wherein said seal member comprises polymeric material.

8. The electrochemical cell as defined in claim 1, wherein said collector assembly and seal member sealingly engage each other following initial pressure venting.

9. The electrochemical cell as defined in claim 1 further comprising an alkaline electrolyte.

10. An electrochemical cell comprising:
    a container having a bottom end and an open top end;
    a positive electrode disposed in said container;
    a negative electrode disposed in said container;
    a seal member disposed in the open top end of said container for closing the open top end of said container, said seal member having a central hub and an opening defined by an upstanding wall formed in the central hub; and
    a current collector having a shaft extending through the opening of said seal member and contacting one of the positive and negative electrodes, wherein the current collector is interference fit within the opening such that the seal member sealingly engages the shaft of the current collector when in a sealed position, and the central hub of the seal member is forced to move along the shaft of the current collection from a sealed position to a vent position upon experiencing a predetermined pressure so as to provide a pressure relief passage between the upstanding well of the seal member and the current collector to vent pressurized gases; wherein the upstanding wall of the seal member is retained in the sealed position by an enlarged diameter step provided on the shaft of the current collector, and the upstanding wall of the seal member is forced to move over the enlarged diameter step to the vent position.

11. The electrochemical cell as defined in claim 10, wherein the current collector includes a shaft having a first diameter sealingly engaging the upstanding wall of the seal member in the sealed position, and a second reduced diameter shaft that has a diameter less than the first diameter, wherein the seal member is forced to move towards the second reduced diameter shaft to provide the pressure relief passage when the seal member is in the vent position.

12. The electrochemical cell as defined in claim 10, wherein the current collector include one or more flutes therein for providing the pressure relief passage when in the vent position.

13. The electrochemical cell as defined in claim 10, wherein said seal member includes a vent path provided on the top surface of the seal member to prevent resealing of the current collector and seal member when in the vent position.

14. The electrochemical cell as defined in claim 10, wherein the seal member and current collector from a collector and seal assembly.

15. The electrochemical cell as defined claim 10 further comprising an alkaline electrolyte.

16. The electrochemical cell as defined in claim 10, wherein said seal member comprises polypropylene.

17. A collector and seal assembly for sealing the open end of an electrochemical cell container, said collector and seal assembly comprising:

a seal member adapted to be disposed in an open end of a container to provide a sealed closure to the open end of the container, said seal member having an opening defined by an upstanding wall; and a current collector having a shaft extending through the opening in said seal member, wherein the current collector is interference fit within the opening such that the upstanding wall of the seal member sealingly engages the shaft of the current collector when in a sealed position, and the seal member is forced to move axially relative to the current collector to move to a vent position upon experiencing a predetermined pressure so as to provide a pressure relief passage between the upstanding wall of the seal member and the current collector to vent pressurized gases; wherein the upstanding wall of the seal member is retained in the sealed position by an enlarged diameter step provided on the shaft of the current collector, and the upstanding wall of the seal member is forced to move over the enlarged diameter step to the vent position.

18. The collector and seal assembly as defined in claim 17, wherein said current collector includes a shaft having a first diameter sealingly engaging the upstanding inner wall of the seal member in the sealed position, and a second reduced diameter shaft that has a diameter less than the first diameter, wherein the upstanding wall of the seal member is forced to move towards the second reduced diameter shaft to provide the pressure relief passage when the seal member is in the vent position.

19. The collector and seal assembly as defined in claim 17, wherein said current collector includes one or more flutes formed therein for providing the pressure relief passage when in the vent position.

20. The collector and seal assembly as defined in claim 17, wherein said seal member includes a vent path provided on the top surface of the seal member to prevent resealing of the current collector and seal member when in the vent position.

21. The collector and seal assembly as defined in claim 17, wherein said seal member comprises polypropylene.

22. The collector and seal assembly as defined in claim 17, wherein said seal member comprises polymeric material.

23. The collector and seal assembly as defined in claim 17, wherein said collector assembly and seal member sealingly engage each other following initial pressure venting.

* * * * *